May 20, 1924.

R. W. PITTMAN

LENS CARRIER FOR MOTION PICTURE APPARATUS

Filed March 8, 1921

INVENTOR
R. W. Pittman
BY his ATTORNEY
Wm. H. Reid.

May 20, 1924.
R. W. PITTMAN
1,494,801
LENS CARRIER FOR MOTION PICTURE APPARATUS
Filed March 8, 1921
2 Sheets-Sheet 2
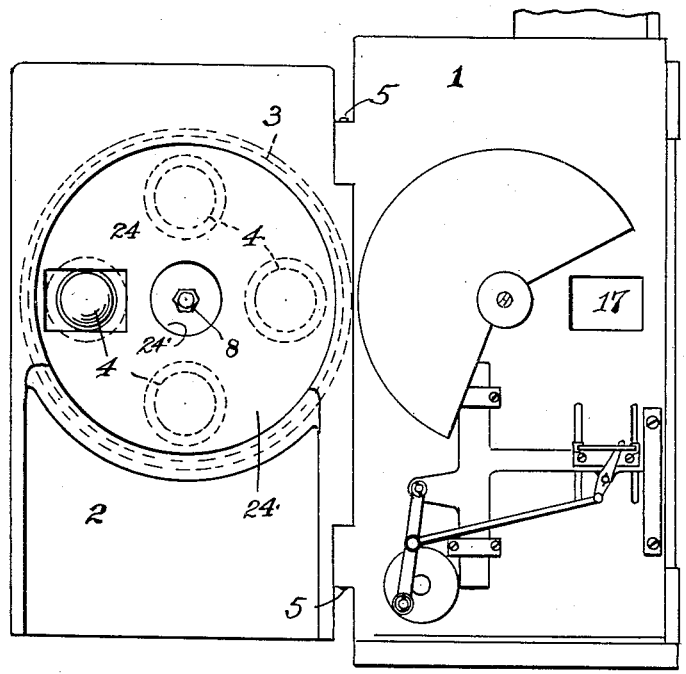
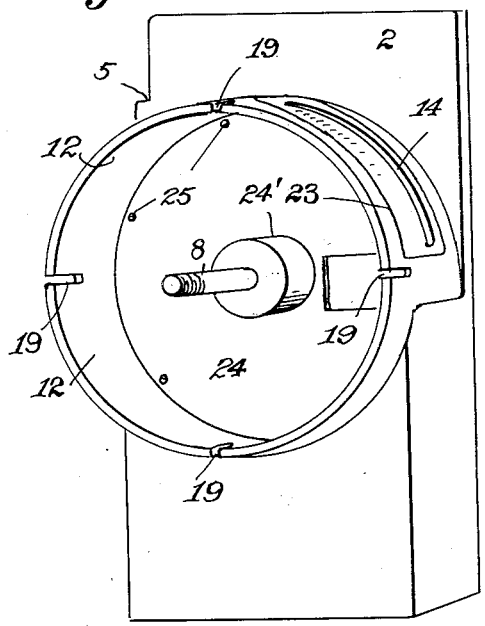
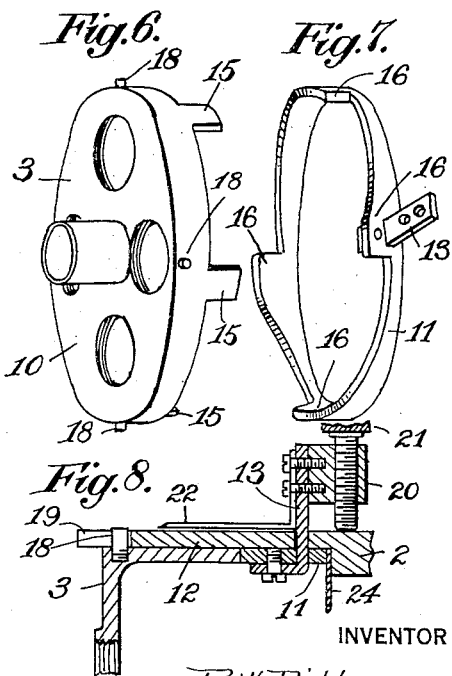
INVENTOR
R.W. Pittman
BY his ATTORNEY
Wm H. Reid.

Patented May 20, 1924.

1,494,801

UNITED STATES PATENT OFFICE.

REINHART W. PITTMAN, OF NEW YORK, N. Y.

LENS CARRIER FOR MOTION-PICTURE APPARATUS.

Application filed March 8, 1921. Serial No. 450,702.

*To all whom it may concern:*

Be it known that I, REINHART W. PITTMAN, a citizen of the United States of America, and resident of New York city, in the county of New York and State of New York, have invented certain new and useful Improvements in Lens Carriers for Motion-Picture Apparatus, of which the following is a full, clear, and exact description.

This invention has reference to cameras wherein it is desired to provide a set of different lenses, which are so mounted on the camera that by a simple manipulation of the lens carrier, any one of the lenses can be brought to the focal axis, and thereupon the selected lens can be adjusted in such axis to provide the proper focus for the exposure.

The object of the present invention is to provide a carrier of this nature, that can be swung to readily bring any lens to the focusing position, and thereupon the carrier for the set of lenses is moved to provide for the necessary focusing adjustment.

A further object is to provide a carrier of this nature that is hinged to the camera body to be swung out to give access to other parts of the camera, and quickly returned to its former position.

In the accompanying drawings showing one embodiment of my invention, Fig. 1 is a plan view of the camera, Fig. 2 is a side elevation of the same partly in section.

Fig. 4 is a front view with the casing swung to the open position.

Fig. 5 shows a perspective view of the mounting of the head on the casing.

Fig. 6 shows the head that supports the lenses in perspective.

Fig. 7 shows the cam ring in perspective.

Fig. 8 is a partial section showing the adjustment and locking means for the cam ring.

Figure 1:
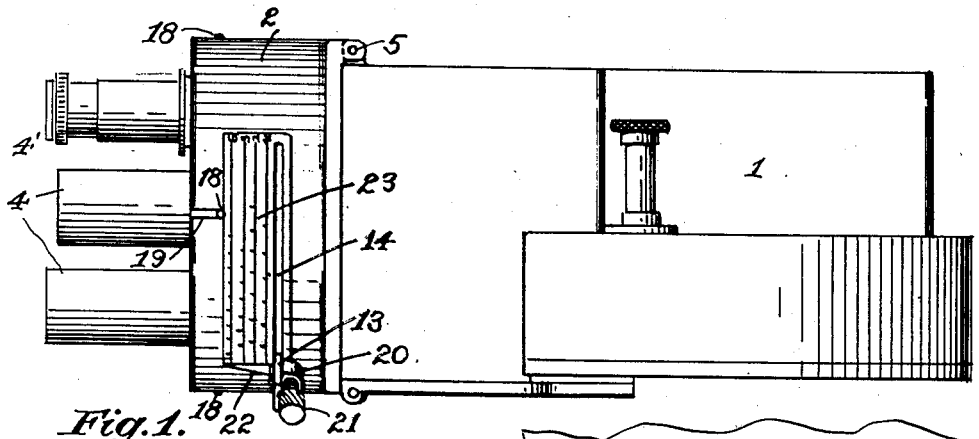
Figure 2:
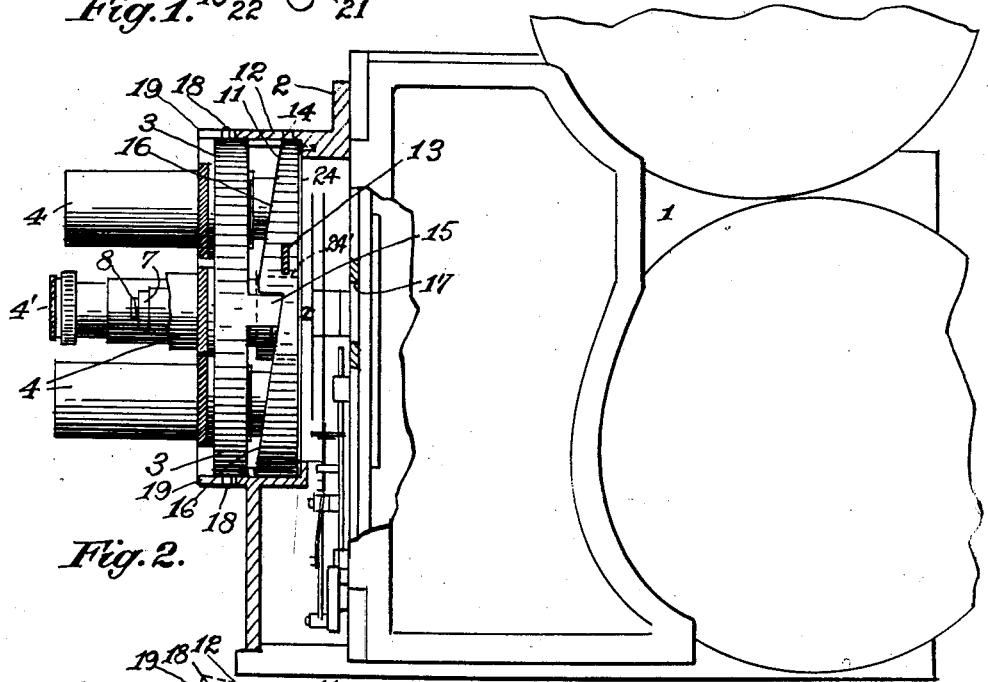

As shown in the drawings, the camera body denoted generally by 1, is provided at the front with a lens carrier, shown as formed essentially by a plate or member 2, which supports a member or head 3 by which several lenses 4, are supported for adjustment.

Figure 3:
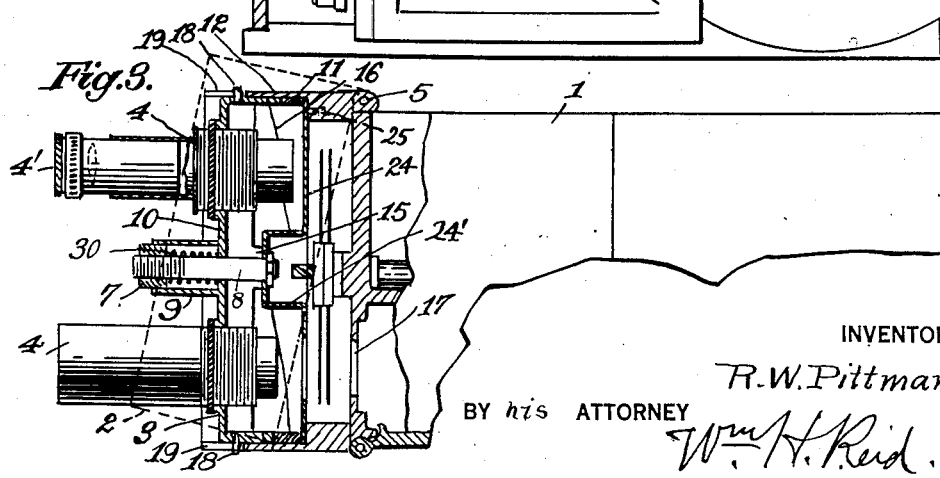
Fig. 3 is a horizontal section, partly in plan.

The member 2 is hinged at 5 to the body 1, to swing out and carry with it the lenses and their adjustment means, see Figs. 3 and 4. This will allow access to the front of the camera.

The supporting means for the lenses, which is the head 3, is shown in the form of a cap having the lenses 4 mounted therein around the axis, which head has a central tube 9 that turns on a collar 7 on a fixed shaft 8 carried by hub 24' of the plate 24. A coil spring 30 on the shaft 8 pressed between the collar 7 and the disk 10 of the head to force the head rearwardly. The cam ring 11, see Fig. 7, is mounted to turn inside of the rim 12 of the carrier plate 2, and is swung by a piece 13 projecting through the slot 14 in the rim 12.

The head 3 is pressed rearwardly by the coil spring 30 as stated, and has a cam engagement with the ring 11, whereby the turn of the ring will move the head forward and thus position the lenses and the head relatively to the body of the camera. As set forth herein, the head 3 is provided with a set of lugs 15, 15, that engage cams or segments 16, 16, on the cam ring 11, see Fig. 7, there being four of these cams, and corresponding lugs on the head 3. Through this arrangement it will be understood that the head 3 can be swung on the shaft 8 to bring any of the four lenses to the film window 17, see Fig. 4.

At this position, the lugs will be brought to engagement with the intermediate portions of each cam respectively, and turning the cam ring one way or the other, will cause the head to be moved back or forth. When the head is shifted a quarter turn, each lug will move beyond its engaging cam, and be brought to engage the adjacent cam in that direction of movement.

Means are further provided for locking or positioning each lens in the focal axis at the exposure window yet it will permit the sliding of the head on the axis for focusing adjustment. As shown I provide a pin-and-slot engagement between the head and the supporting rim 12. The head is provided with four pins 18, 18, that engage slotted portions 19, 19, in the rim 12, and when the head is given a quarter turn, after being drawn forward, the pins can engage respectively with the next slots.

It will be understood that when a change of lenses is desired, the cam ring 11 is swung by the piece 13, causing the lugs 15 to ride up the cams to their high portions at the front, that will so advance the head against the tension of the coil spring 11, that the pins 18 are free of the slots 19. Then if the head is turned the lugs 15 will be beyond the high cam spots, and the head would be forced rearward by the coil spring, but this is prevented because the pins 18 will now press on the edge of the rim 12 between the slots 19. The head is therefore turned to bring the pins to engage the next slots, when the head will be pressed rearward by the coil spring as the pins now enter these slots, until the lugs 15 engage the cam 16 of the ring 11. Thereupon, this cam ring is again swung and the cams will adjust the head back or forth until the proper focus is obtained. In this manner any of the four lenses 4 can be brought to the focusing point by the head, and there adjusted for focus.

Means are therefore provided for locking the cam ring 11 in position to swing to focus the head and lenses, and also for indicating by a scale and a pointer the focusing adjustment. As shown a block 20 is carried by the piece 13, with an adjustment screw 21 therein, that when turned down will engage the rim 12 and lock the cam ring 11 in any desired position. A pointer 22 carried by the piece 13, moves over the rim 12 to register with a scale 23 on the rim adjacent the slot 14.

One of the lenses 4' is shown as being arranged to slide in and out. For various kinds of work in this art a series of lenses is needed, which may comprise a short focus lens say 1¼ inch, and 2 inch lens, and 3 inch lens, and also a telephoto lens of about 6 inch focus. The latter being of considerable length when properly extended would interfere with the angle of projection of the other lenses, and therefore I form this lens with a telescopic tube that can be drawn out for use and pushed inward when another lens is used.

It will thus be seen that I have provided the casing that is hinged to the front of the camera body to swing out and give access to the interior, or to parts adjacent the lenses. To this casing is attached the lens carrier with its means for rotary and axial adjustment also the indicating and securing means. The lenses will be correctly positioned in the focal axis of the camera as each is brought into position for use; each lens is supported adjustably in such position; and the parts are clamped in the desired positions.

What I claim is—

1. In a camera, the combination of a casing, a shaft fixed in the axis of the casing, a head rotatable on said shaft, a series of lenses carried by the head to be selectively brought to the focal axis, a coil spring on the shaft arranged to force the head rearward, a ring arranged to swing in the casing, said ring and head having a cam engagement to cooperate with said spring to move the head on the shaft to focus each lens when brought to the focal axis.

2. In a camera, the combination, of a casing, a shaft fixed in the axis of the casing, a head rotatable on said shaft, a series of lenses carried by the head to be selectively brought to the focal axis, a coil spring on the shaft to force the head rearward, a ring arranged to swing in the casing, said ring and head having a cam engagement to cooperate with said spring to move the head on the shaft to focus each lens when brought to the focal axis, said head and casing being provided with a pin on one member engaging a slotted portion on the other member when each lens is brought to the focal axis to position the head and lock it in such position.

3. In a camera, the combination of a casing, a shaft fixed in the axis of the casing, a head rotatable on said shaft, a series of lenses carried by the head to be selectively brought to the focal axis, a coil spring on the shaft arranged to force the head rearward, a ring arranged to swing in the casing, said ring and head having a cam engagement to cooperate with said spring to bring the head on the shaft to focus each lens when brought to the focal axis, said casing having a slotted portion and said head being provided with a pin at each lens position arranged to engage said slotted portion of the casing when each lens is brought to the focal axis to position the head and lock it in such position.

4. In a camera, the combination with the casing of a head rotatably supported in the casing and provided with a series of lenses arranged to be selectively brought to the focal axis of the camera on turning the head, said head being also movable axially to focus each of said lenses, guide means for said axial movement of the head relative to the casing comprising a pin on one of said latter members engaging a slotted portion of the other member, the head when advanced causing the pin to be free of the slot to permit turning of the head to another similar focusing position.

5. In a camera, the combination with the casing, of a head rotatably supported in the casing and provided with a series of lenses arranged to be selectively brought to the focal axis of the camera on turning the head, said head being also movable axially to focus each of said lenses, guide means for said axial movement of the head relative to the casing comprising a pin on one of said latter members engaging a slotted portion on the other member, the head when advanced causing the pin to be free of the slot to permit turning of the head to another similar focusing position, a cam ring supported to turn in engagement with said head to advance the head, a spring to retract the head for control by said cam ring, an arm on said cam ring projecting out of the casing, a pointer on said arm arranged to move over the casing, and a scale on the casing for said pointer arranged to indicate the focusing movement of the ring and head.

6. In a camera, the combination with the casing, of a head rotatably supported in the casing and provided with a series of lenses arranged to be selectively brought to the focal axis of a camera, said head being also movable axially to focus each of the lenses, a set of lugs on the head, a ring having a set of cams one for each lens and engaging said lugs to advance the head, and a spring arranged to press the head lugs against the ring cams.

7. In a camera, the combination with the casing, of a head rotatably supported in the casing and provided with a series of lenses arranged to be selectively brought to the focal axis of the camera, said head being also movable axially to focus each of the lenses, a set of lugs on the head, a ring having a set of cams one for each lens and engaging said lugs to advance the head, a spring arranged to press the head lugs against the ring cams, and means arranged to lock the ring on the head in adjusted positions.

8. In a camera, the combination with the casing, of a head rotatably supported in the casing and provided with a series of lenses arranged to be selectively brought to the focal axis of the camera, said head being also movable axially to focus each of the lenses, a set of lugs on the head, a ring having a set of cams one for each lens and engaging said lugs to advance the head, a spring arranged to press the head lugs against the ring cams, the casing having a slotted portion, and pins on the head one for each lens arranged to alternately engage the head slotted portion to guide the lens in axial adjustment by the cam ring.

9. In a camera, the combination with the casing, of a head rotatably supported in the casing and provided with a series of lenses arranged to be selectively brought to the focal axis of the camera, and means for retracting one of said lenses into the head to prevent interference with the other lenses.

10. In a camera, a stationary casing, a head rotatably supported in the casing and provided with a series of lenses arranged to be separately brought to the focal axis of the camera on turning the head, said head being also movable axially in the casing to focus each of said lenses, and a stationary guide means in the casing for said axial movement of the head that is arranged to prevent turning movement of the head in each said focusing position.

11. In a camera, a stationary casing, a head rotatably supported in the casing and provided with a series of lenses arranged to be separately brought to the focal axis of the camera on turning the head, said head being also movable axially in the casing to focus each of said lenses, a stationary guide means in the casing for said axial movement of the head that is arranged to prevent turning movement of the head in each said focusing position, and means to lock the head in said axial adjusted positions.

12. In a camera, a head rotatably supported in the casing and provided with a series of lenses arranged to be separately brought to the focal axis of the camera on turning the head, said head being also movable axially in the casing to focus each of the lenses, a rotary member concentric with the head, and cooperating means on the rotary member and on the head arranged to cause axial movement of the head when the rotary member is turned, whereby to focus each lens in its focal axis position.

Signed at New York city, March 7th, 1921.

REINHART W. PITTMAN.